Patented May 29, 1945

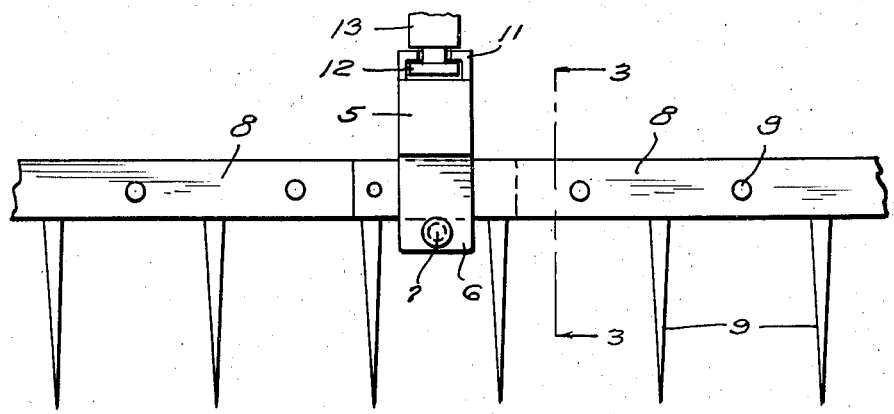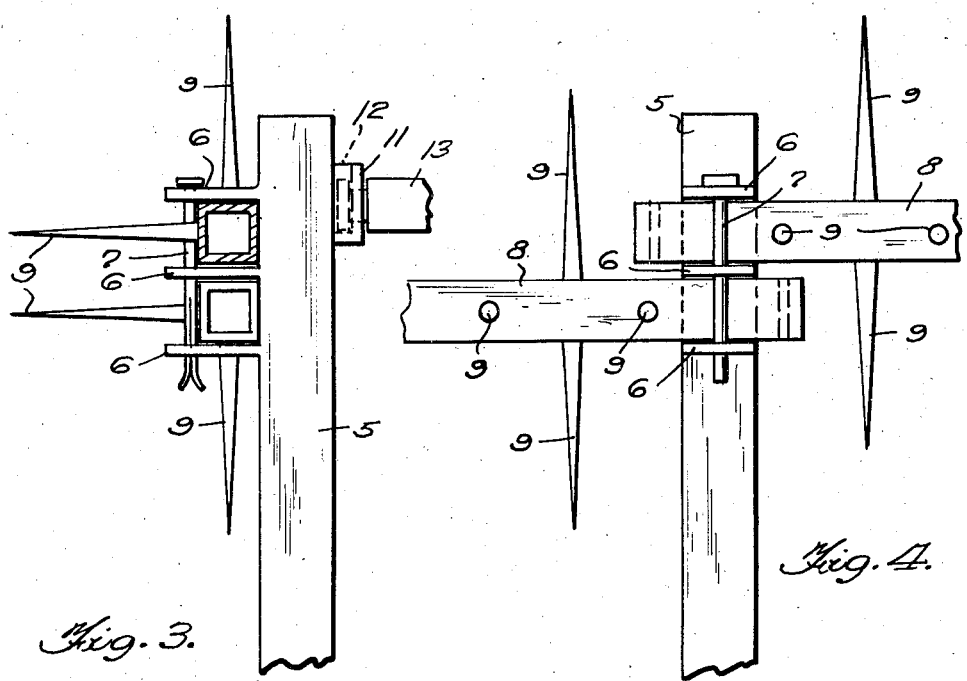

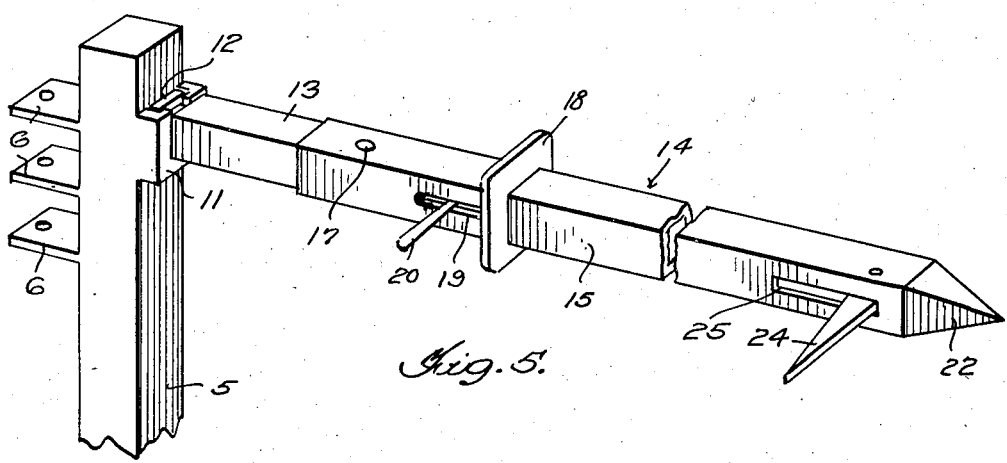

2,376,903

UNITED STATES PATENT OFFICE 2,376,903

HAYSTACK FENCE

Urie M. Coe, Regina, Mont.

Application July 12, 1944, Serial No. 544,589

7 Claims. (Cl. 256—31)

This invention appertains to new and useful improvements in hay stack fences, the principal object being to provide a fence of this character which can be quickly set up either on frozen or dry ground without the necessity of digging holes or unrolling and stretching barbed wire.

Another important object of the invention is to provide a knock-down hay stack fence which makes it unnecessary to use a permanent hay corral.

Other objects and advantages of the invention will become apparent to the reader of the following description.

In the drawings:

Figure 2 is a fragmentary top plan view of the fence.

Figure 3 is a sectional view taken substantially on the line 3—3 of Figure 2.

Figure 4 is a fragmentary outside elevational view of the fence.

Figure 5 is a fragmentary perspective view showing one of the anchoring units.

Figure 6 is a longitudinal sectional view through one of the anchoring units.

Figure 7 is a perspective view of one of the barbed bars.

Figure 8 is a fragmentary detailed sectional view of a modification of the barbed bar holder.

Figure 9 is a fragmentary perspective view showing a corner of the fence.

Figure 1:
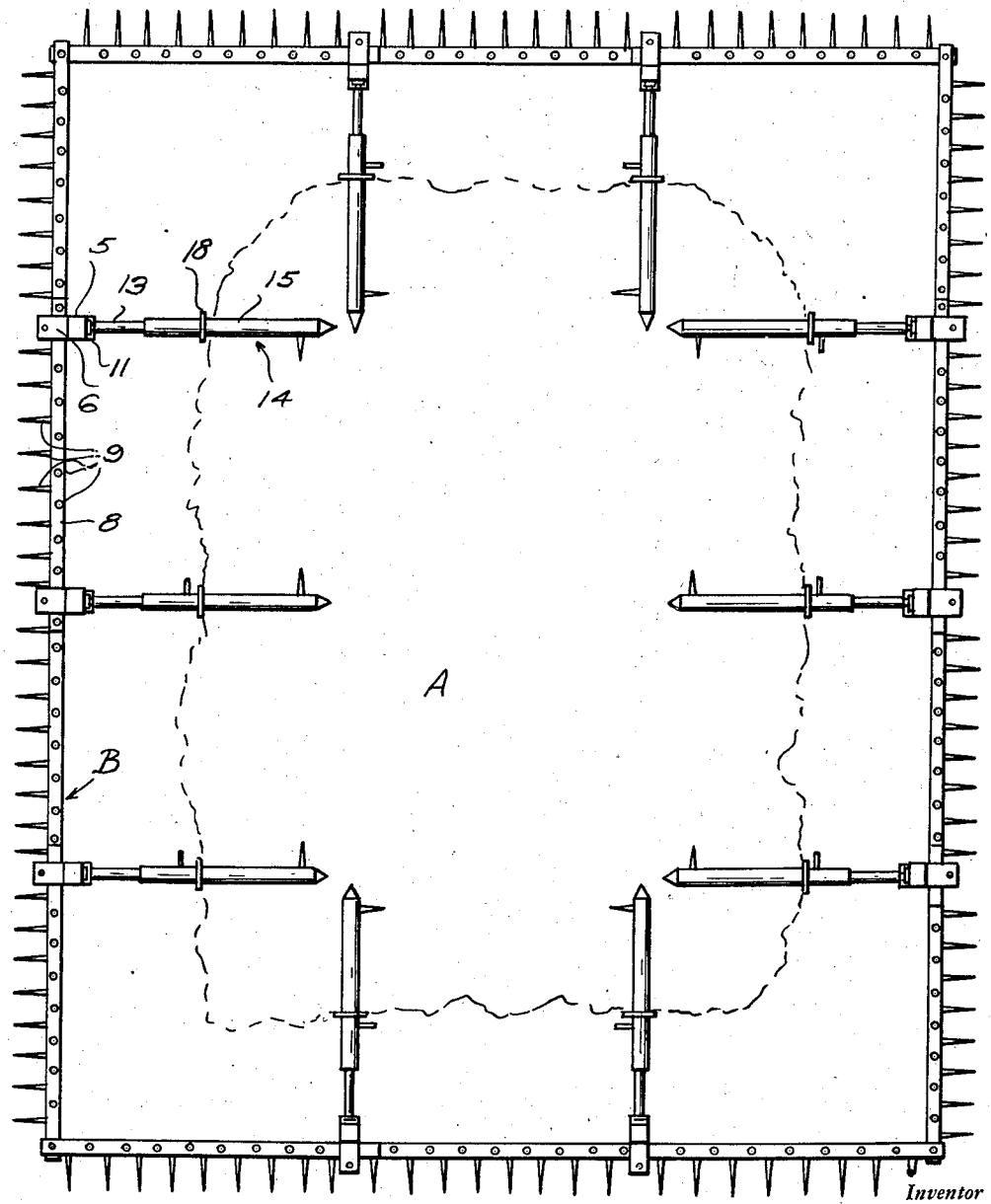
Figure 1 is a top plan view showing the fence in use with a hay stack only briefly outlined.

Referring to the drawings wherein like numerals designate like parts, it can be seen in Figure 1, that reference character A is placed upon a hay stack, only briefly outlined, while reference character B denotes the improved fence structure which is provided with anchoring units embedded in the hay stack, the fence forming an enclosing or substitute corral for the hay stack.

The fence consists of a plurality of stake or pointed posts 5 which are driven into the ground at points around the hay stack A and projecting outwardly from the upper portion of each post 5 are lugs 6, each of which is apertured for accommodating an elongated vertically disposed split pin or cotter key 7 which serves to prevent displacement from the post of the adjacent ends of a pair of bars 8, the bars being disposed with their ends in overlapping relation to each other as suggested in Figure 4. Prongs 9 project upwardly, outwardly and downwardly for the purpose of preventing cattle and other animals from approaching the hay stack.

At the corner of the fence structure, the adjacent bars 8 are brought together in overlapping relation and are apertured to receive a corner pin 10. (See Figure 9.)

The inner side of the upper portion of each post 5 has a channeled member or socket 11 for receiving the head portion 12 of a corresponding arm 13 on which is mounted an anchoring device herein referred to by numeral 14, and which consists of an elongated squared tube 15 adjustably disposed over the arm 13, the arm 13 having openings 16 therein through which a pin 17 disposed through the outer end of the tube 15 is selectively disposed. Numeral 18 denotes a hay stack hilt or shoulder 18, slightly outwardly of which the tube 15 is formed with a slot 19 through which a handle 20 projects. This handle 20 projects from one end of an elongated rod 21 which extends toward the pointed end 22 of the tube 15 and is connected as at 23 to one end of a pointed anchoring element 24, which is capable of being swung by the rod 21 into the tube 15 through a slot 25 therein, when the rod 21 is pulled outwardly by the handle 20. Thus it can be seen, that this anchoring device is to be forced into a hay stack and the handle 20 operated to set the anchoring element 24 in anchoring position.

Instead of the lugs 6 for holding the overlapped ends of the bars 8, a plate 8a may be provided and equipped with outstanding lugs 8b between which the adjacent ends of bars 8 may be disposed. The plate 8a preferably has one or more flanges 8c for overlapping the side portions of the corresponding post 5a and also with a threaded member 8d disposed through an opening in the post 5a and equipped with a wing nut 8e. Thus the holder can be vertically adjusted on the post.

It can be seen from the foregoing, that this fence can be quickly set up or knocked down and that it can be conveniently moved from place to place on farm lands.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A hay stack fence comprising a plurality of barbed runners, posts for supporting the runners and hay stack anchoring devices mounted on the posts.

2. A hay stack fence comprising a plurality of barbed runners, posts for supporting the runners and hay stack anchoring devices mounted on the posts, each of the devices consisting of an arm projecting from the post and a pointed tube adjustably disposed on the arm.

3. A hay stack fence comprising a plurality of barbed runners, posts for supporting the runners and hay stack anchoring devices mounted on the posts, each of the devices consisting of an arm projecting from the post and a pointed tube adjustably disposed on the arm, said tube being provided with an anchoring element thereon.

4. A hay stack fence comprising a plurality of barbed runners, posts for supporting the runners and hay stack anchoring devices mounted on the posts, each of the devices consisting of an arm projecting from the post and a pointed tube adjustably disposed on the arm, said tube being provided with an anchoring element thereon pivotally mounted and provided with an actuating handle.

5. A hay stack fence comprising a plurality of barbed runners, posts for supporting the runners and a hay stack anchoring device mounted on the posts, and detachably connecting means between the devices and the corresponding posts.

6. A hay stack fence comprising a plurality of barbed runners, posts for supporting the runners and hay stack anchoring devices mounted on the posts, said posts being provided with an adjustable holder for receiving and holding the adjacent ends of barbed runners.

7. A hay stack enclosing comprising a continuously constructed fence made up of barbed runners and anchoring elements disposed from the fence structure and into an enclosed hay stack for fixing the position of the fence with respect to the hay stack.

URIE M. COE.